Oct. 9, 1923.  W. T. TABB  1,470,037
VALVE
Filed March 18, 1920  2 Sheets-Sheet 1

INVENTOR
Warner T. Tabb
BY William F. Nickel
ATTORNEY

Oct. 9, 1923.  1,470,037
W. T. TABB
VALVE
Filed March 18, 1920.   2 Sheets-Sheet 2
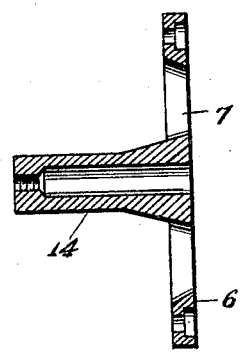
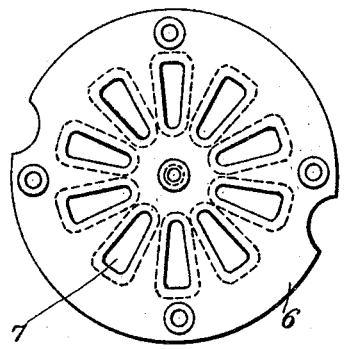
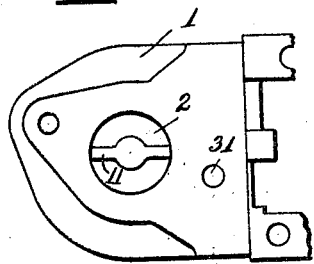
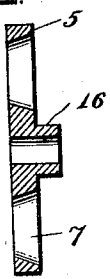
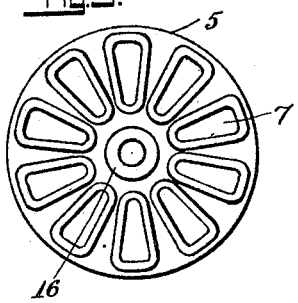
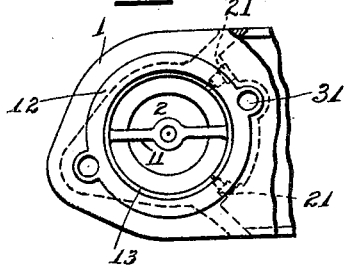
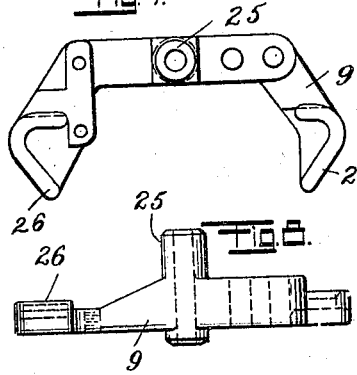
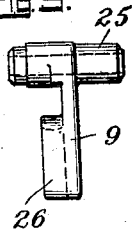
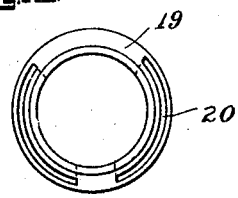
INVENTOR
Warner T. Tabb
BY William F. Nickel
ATTORNEY Patented Oct. 9, 1923.

1,470,037

UNITED STATES PATENT OFFICE.

WARNER T. TABB, OF BROOKLYN, NEW YORK, ASSIGNOR TO DUPLEX ENGINE GOVERNOR COMPANY, INC., OF BROOKLYN, NEW YORK, A CORPORATION OF NEW YORK.

VALVE.

Application filed March 18, 1920. Serial No. 367,012.

*To all whom it may concern:*

Be it known that I, WARNER T. TABB, a citizen of the United States, residing in Brooklyn, in the county of Kings and State of New York, have invented certain new and useful Improvements in Valves, of which the following is a specification.

My invention relates to an improvement in valves; particularly valves for internal combustion engines to restrict the supply of fuel thereof in case of operation at excessively high speed.

An object of this invention is to provide a valve which, with its seat and other associated parts, will be simple in design and small and compact in size and shape, so as to require a minimum of space to install the same.

Another object of my invention is to provide a controlling valve for an internal combustion engine that is capable of being conveniently and easily connected to the actuating mechanism for said valve, and at all times moved or held stationary, as conditions require, in a most positive, certain and efficient manner.

Other objects and advanges of my invention are set forth in the following description, taken with the accompanying drawings; and the precise characteristics of my improvement are defined in the appended claims. This disclosure, however, is explanatory only; and I do not limit myself to the exact embodiment hereinafter presented; but reserve the right to make changes not specifically illustrated herein but embraced by the general meanings of the terms in which the claims are expressed.

Figure 1:
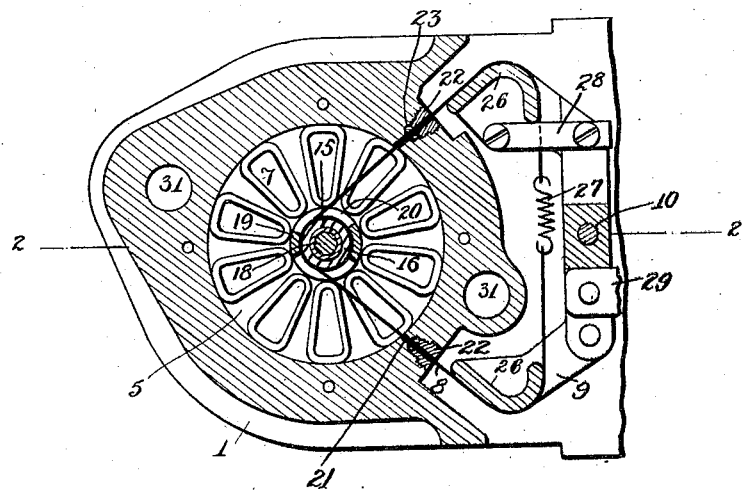
Figure 1 is a top plan, partly in section, on line 1—1, Figure 2, of a valve according to my invention; with parts associated therewith.
Figure 2:
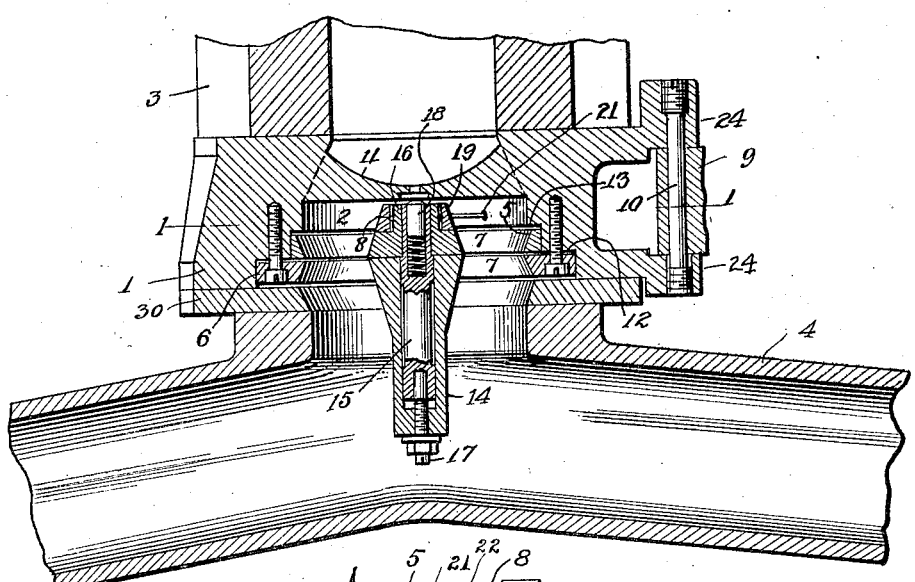
Figure 2 is a vertical section on the line 2—2, Figure 1.
Figure 3:
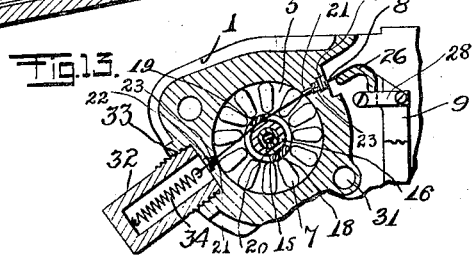
Figure 3 is a top plan and Figure 4 a cross-section of a seat for the valve.

Figures 5 and 6 respectively, are similar views of the valve;

Figures 7, 8 and 9 are respectively a top view, a side view and an end view of an element for actuating the valve;

Figures 10 and 11 are respectively a top view and a bottom view of a portion of a casting providing a housing for the valve and its seat;

Figure 12 is a view of a detail; and

Figure 13 is a fragmentary sectional view of a modification.

The same numerals identify the same parts throughout.

The drawings show at 1 a body having the form of a portion of a casting with a passage 2 leading through it. This body is inserted between a carbureter 3 and an intake conduit or manifold 4; and inside the passage 2 I dispose a pivoted valve 5 and a seat 6. Both the valve and the seat extend transversely of the passage 3, and have radially arranged openings 7, which come into and go out of registry according as the valve is moved in one direction or the other. To actuate said valve, I employ a flexible element, such as a wire 8, secured to the valve and connected on the exterior of the body 1 to mechanism embracing an element or rocker 9, pivotally mounted on the casting 1; as by a bolt 10. The manifold 4 communicates with the cylinders of an internal combustion engine, not shown; and the rocker 8 is controlled by a mechanical or electrical governor, not shown, to move the valve towards closed position and restrict the gaseous fuel whenever the engine approaches its limiting speed.

When the casting is in operative position, the passage 2 will be vertical; and the body 1, being relatively thin between its upper and lower faces, occupies but little space and can be easily fitted between the manifold 4 and carbureter 3. It has an inside rib 11, spanning the passage 2; and is counterbored adjacent its lower end, to provide a shoulder 12, against which the seat 6 is disposed. The passage is also counterbored above the seat 6 to provide a second shoulder 13 for the valve 5. I preferably give the seat 6 the shape of a round plate or disk and fasten it to the shoulder 12 by screws; and the valve 5 is between the seat 6 and the shoulder 13, which is a little below the rib 11. The valve may also be in the form of a round disk or plate; and the openings in both the valve and the disk are made so that they contract towards each other, to give an advantageous mixing action on the air and combustible gas or vapor drawn from the carbureter 3. The valve and its seat are separately illustrated in Figures 3, 4, 5 and 6.

When the valve is in full open position, the openings 7 thereof register with the openings of the seat; but when the valve is moved towards closed position to throttle the motive agent supplied by the carbureter 3, the openings may move first partly and then completely out of registry. To this end I mount the valve on the seat so that the valve rotates about its axis or center. The seat has a stem 14, projecting into the manifold 4, and made hollow to receive a spindle 15; the upper end of which projects above the seat to afford a pivot; and is engaged by a hub 16 on the valve; whereby the valve can turn with the spindle when the wire 8 is pulled either way. A screw or bolt 17 in the bottom of the stem 14 engages the spindle 15 and in the top of the spindle is a spring-pressed plug or member 18, abutting a button or plug in the lower side of the rib 11.

I may groove or recess the hub 16 for the wire 8, which may make a complete loop about the hub, and be secured to the hub by any suitable means. Over the hub I place a retaining ring 19, having slots 20 in opposite sides, through which the element 8 may extend. I also make apertures 21 in the sides of the body 1, through which the wire 8 may be led to the rocker 9. The outer ends of the apertures 21 are counter-bored and threaded to receive perforated glands 22; and at the inner ends of these glands are perforated packing rings 23, to make leakproof bearings for the wire 8; said bearings nevertheless allowing the wire to move freely therein.

The ring 19 can be secured to the hub in any feasible manner. I may also dispense with the loop in the wire 8 round the hub 16, and make this wire engage the hub at one point only if desired.

On the body 1 are portions 24, supporting the pivot bolt 10, and the rocker 9 has a bearing 25 to be placed between these portions and receive the bolt 10. This bearing 25 is of course between the ends of the rocker, and at the ends are projections 26, in the form of upstanding curved ribs, as shown in Figures 1 and 7. The terminal portions of the wire 8 are bent around these ribs and united to a spring 27 between them. I utilize a clamp 28 over the wire 8 near one of the projections 26, and held on by screws, to anchor the wire and prevent slipping.

To the rocker 9 I pin a link shown in part at 29. The other end of this link is connected to members leading to the governor above-mentioned and whenever normal speed is exceeded the rocker is moved to turn the valve towards closed position.

While the valve is adapted for internal combustion engines, it may of course be employed on steam engines and other units also.

The body 1 will of course be given a tight and efficient connection with carbureter and manifold, in any manner known in the art. At 30 is an adapter flange, to be between the manifold and the housing 1, and secured by bolts which are provided to engage holes 31. This adapter flange closes the lower end of body 1 and provides a set to be engaged by the manifold.

The spindle 15 may have a small shoulder to engage the hub 16, and by the bolt 17 the spindle can be adjusted to keep the valve out of direct contact with the seat, to give clearance when required; such clearance of course being very slight and merely preventing friction.

The valve 5 is made rigid with the spindle 15 and when the valve turns, the spindle turns too in the stem or bearing 14. Any suitable means for securing the valve and the spindle together may be employed.

In Figure 13, the wire or element 8, instead of being engaged at both ends by a rocker 9, is secured to this rocker at one end only by means of the clamp 28 or in any other convenient manner. The opposite extremity of this element passes through an opening 21 in the side of the body 1, similar to the openings or apertures 21 already described, and is fastened to a spiral spring. Hence, when the rocker is turned on the pivot 10 to pull the wire 8 to move the valve towards closed position, the spring will be extended, and when the rocker is released the spring, acting alone or with other parts not shown, will return the valve to full open position. The spring in question is housed in a cap or thimble 32 which is screwed into a threaded recess 33 in the side of the body 1; the spring itself being indicated at 34. This spring is anchored to the bottom of the thimble and its free end is secured to the wire 8, which passes through packing 23 and a gland 22 in the aperture 21, similar to the packing and glands above-mentioned.

Having described my invention, what I believe to be new and desire to secure and protect by Letters Patent of the United States is:—

1. The combination of an intake conduit for an engine, of a seat inside said conduit and extending transversely of same, said seat having radially arranged openings, and a valve having correspondingly arranged openings, the openings of the valve contracting towards the opening of the seat, said valve being movable to carry the openings thereof into and out of registry with the first-named openings.

2. A seat having one or more openings and carrying a pivot, a valve having one or more openings and provided with a hub engaging said pivot, and an element engaging said hub to actuate said valve.

3. A body having a seat therein, a valve movably associated with the seat, and a flexible element connected to said valve and passing through the body to move same towards open and closed position.

4. A body having a passage extending therethrough, a seat extending transversely of said passage, a valve in said passage co-operating with said seat, and a flexible element connected to said valve and extending through to the exterior of said body to move the valve towards open and closed position.

5. A seat comprising a disk having one or more radially arranged openings, and being provided with a hollow stem to receive a spindle having a thrust member and providing a pivot for a valve to co-operate with said seat.

6. A valve comprising a disk having one or more radially arranged openings, and having a hub at the center of said disk, and an operating element connected to the hub.

7. The combination of a pivoted valve having one or more radially arranged openings and a centrally located hub, a flexible actuating element engaging said hub, and a retaining ring on said hub over said element.

8. A retaining ring for a hub on a valve, said ring having oppositely located slots to give passage to a flexible element connected to said hub to permit movement of the valve.

9. A valve comprising a disk having one or more radially arranged openings and a hub at the center of said disk, and a spindle having a thrust-member secured in said hub.

10. A body having a passage therethrough, a valve and a seat in said passage, a flexible element connected to the valve to actuate same, and bearings carried by said body to permit the element to pass through to the exterior of the body.

11. A body having a passage therethrough, a seat in said passage, a valve co-operating with the seat, a flexible element secured to the valve, and extending through apertures in said body to the exterior of the same, and a rocker on the outside of said body to move said element in opposite directions.

12. A body having a passage therethrough, a seat having radially arranged openings in said passage, a valve having corresponding openings associated with said seat, a flexible element connected to the middle of the valve, bearings in said body through which the element extends to the exterior thereof, a pivoted rocker having projections around which the terminal portions of said element are bent, and a spring uniting the ends of the element between said portions.

13. A housing having a bore or passage therethrough, and being of relative thinness between its opposite faces, and having one or more apertures in its sides communicating with said passage, a valve in said passage, and a flexible operating element for the valve passing through said apertures.

14. A body having a passage extending therethrough, a seat extending transversely of said passage, a valve co-operating with said seat, and a flexible element connected to said valve and extending to the exterior of said body to move the valve.

In witness whereof, I have signed my name to this specification this 2nd day of March 1920.

WARNER T. TABB.

Witness:
H. A. ROBERTS.